United States Patent [19]
Dickinson, Jr. et al.

[11] Patent Number: 5,742,026
[45] Date of Patent: Apr. 21, 1998

US005742026A

[54] PROCESSES FOR POLISHING GLASS AND GLASS-CERAMIC SURFACES USING EXCIMER LASER RADIATION

[75] Inventors: James E. Dickinson, Jr., Corning; Bryan R. Wheaton, Cameron Mills, both of N.Y.

[73] Assignee: Corning Incorporated, Corning, N.Y.

[21] Appl. No.: 494,911

[22] Filed: Jun. 26, 1995

[51] Int. Cl.$^6$ .................................................. B23K 26/00
[52] U.S. Cl. ........................... 219/121.69; 219/121.85
[58] Field of Search ........................ 219/121.65, 121.66, 219/121.69, 121.85, 121.68; 264/400, 409; 65/33.2, 61, 104, 33.1; 501/10; 437/173; 73/105; 250/306; 428/64.1

[56] References Cited

U.S. PATENT DOCUMENTS

| | | |
|---|---|---|
| 2,865,725 | 12/1958 | Schroeder . |
| 2,958,593 | 11/1960 | Hoover et al. . |
| 3,230,672 | 1/1966 | Anthon . |
| 3,597,887 | 8/1971 | Hall . |
| 3,959,935 | 6/1976 | Stoppacher . |
| 4,138,228 | 2/1979 | Hartfelt et al. . |
| 4,338,114 | 7/1982 | Brockway et al. ............. 65/104 |
| 4,609,380 | 9/1986 | Barnett et al. . |
| 4,682,003 | 7/1987 | Minakawa et al. . |
| 4,842,619 | 6/1989 | Fritz et al. . |
| 5,139,967 | 8/1992 | Sandhu et al. ............. 437/173 |
| 5,314,522 | 5/1994 | Kondo et al. ............. 65/33.2 |
| 5,374,291 | 12/1994 | Yabe et al. ............. 65/33.2 |
| 5,383,354 | 1/1995 | Dovis et al. ............. 73/105 |
| 5,420,796 | 5/1995 | Weling et al. ............. 250/306 |
| 5,440,122 | 8/1995 | Yasutake ............. 250/306 |
| 5,450,434 | 9/1995 | Ota et al. ............. 219/121.69 |
| 5,473,138 | 12/1995 | Singh et al. ............. 219/121.69 |
| 5,476,821 | 12/1995 | Beall et al. ............. 501/10 |
| 5,483,038 | 1/1996 | Ota et al. ............. 219/121.69 |
| 5,487,931 | 1/1996 | Annacone et al. ............. 428/64.1 |
| 5,491,116 | 2/1996 | Beall et al. ............. 65/33.1 |
| 5,514,850 | 5/1996 | Miyazaki et al. ............. 219/121.69 |

FOREIGN PATENT DOCUMENTS

| | | | |
|---|---|---|---|
| 0535620 | 9/1992 | European Pat. Off. . | |
| 60-171240 | 9/1985 | Japan ........................... | 65/61 |
| 2-250391 | 10/1990 | Japan . | |
| 7-48189 | 2/1995 | Japan . | |
| 2227701 | 8/1990 | United Kingdom ............. | 219/121.69 |

OTHER PUBLICATIONS

Hecht, *The Laser Guidebook*, 2nd ed, New York: McGraw Hill (1992).

"Lambda Lasers: The UV-tool for industrial innovative applications," Gottingen; Germany: Lambda Physik, Inc.

"Lambda Physik excimer lasers: 15 years of excellence in excimer laser technology," Gottingen, Germany: Lambda Physics, Inc.

*Lambda Highlights No. 1*, Gottingen, Germany: Lambda Physics, Inc. (Oct., 1986).

*Lambda Highlights No. 4*, Gottingen, Germany: Lambda Physics, Inc. (Oct. 1988).

*Lambda Industrial No. 6*, Gottingen, Germany: Lambda Physics, Inc. (Jun. 1989).

*Lamdba Industrial No. 8*, Gottingen, Germany: Lambda Physics, Inc. (Nov. 1994).

"Excimer Laser Treatment Smooths Ceramic and Metal Surfaces," *Advanced Materials* (Sep. 12, 1994).

"Materials Alert," *Advanced Materials and Processes*, p. 15 (Feb., 1995).

"Excimer Laser Surface Treatment of Bulk Ceramics" by Hontzopoulos in Applied Physics A (Solids and Surfaces) vol. A52, No. 6, pp. 421–424, Jun. 1991.

*Primary Examiner*—Geoffrey S. Evans
*Attorney, Agent, or Firm*—Milton M. Peterson

[57] ABSTRACT

A method for polishing glass, ceramic, and glass-ceramic surfaces. The method includes exposing the surface to ultraviolet laser radiation under conditions effective to smooth the surface. Methods for polishing glass-ceramic surfaces containing spinel crystals using 193–351 nm radiation of a rare gas halide excimer laser operating at about 150 to about 400 mJ/cm$^2$ are disclosed. Using the methods of the present invention, surfaces having an R$_a$ of about 4 to about 2 Å are produced.

17 Claims, 2 Drawing Sheets

PROCESSES FOR POLISHING GLASS AND GLASS-CERAMIC SURFACES USING EXCIMER LASER RADIATION

FIELD OF THE INVENTION

The present invention relates to a method for polishing surfaces.

BACKGROUND OF THE INVENTION

In the manufacture of articles having glass, ceramic, and glass-ceramic surfaces, it is frequently desirable to refine the surfaces of such articles to adjust their thickness or surface finish. Traditionally, such modifications to the surfaces of glass, ceramic, and glass-ceramic surfaces are achieved chemically, mechanically, or thermally.

One method of surface refinement, particularly well-suited to refining glass surfaces, involves grinding the surface to the desired shape and thickness followed by a fire polishing process. The fire polishing process softens or melts the surface, which deliquesces due to the resulting lower viscosity in a smoothed surface. The process, however, because of its dependency on material flow, frequently results in a loss of surface detail, such as significant rounding of sharp edges and filling of depressions.

European Patent Application No. 0,535,620 to Jaschek discloses a method for polishing glass surfaces by exposing the surface to a point acting energy source, such as $CO_2$ laser. The laser partially melts the surface, but, in contrast to other thermal techniques, the melted region is confined to a very thin surface layer. This preserves existing ground patterns, structures, and angles, and only slightly rounds sharply ground edges.

Thermal processing of glass surfaces suffers from several disadvantages.

First, the process is limited to glass materials. The process is unsuitable for smoothing ceramic materials, whose crystalline structure is significantly disrupted at temperatures necessary to achieve flow of the material. It is also of limited value in smoothing glass-ceramic surfaces, because the surface melting necessary to permit flow of the glass matrix causes changes in orientation and structure of the ceramic particles imbedded therein. These changes adversely affect the glass-ceramic's Young's modulus, hardness, chemical and physical durability, and other macroscopic properties.

Second, on cooling, the surface frequently develops microcracks, which weaken the surface and promote development of macroscopic fractures. Although microcrack development has been reduced by conducting the thermal smoothing process on glass articles at elevated temperatures, the strength of the glass is still compromised to some extent by thermal smoothing processes.

Another method of polishing glass, ceramic, and glass-ceramic materials involves first lapping the material to near net thickness, followed by polishing to the desired final thickness and surface finish. Since lapping uses coarse abrasive particles which produce moderate to severe subsurface damage to the material, one purpose of polishing is to remove this "damaged" layer. Subsequent to this, polishing acts to smooth the surface to the desired finish by a combination of physical and chemical interactions with the surface. Traditionally, polishing compounds are abrasives, most frequently, cerium or aluminum oxide particles, dispersed in an aqueous solution. The polishing action is achieved by exerting pressure on the material to be polished via a coated pad while dripping the slurry on the material so that it is incorporated between the pad and the surface. Polishing slurries provide high polishing efficiencies but are messy and inconvenient to use. Moreover, the process requires frequent slurry replenishment and backup lap replacement, which limit its utility for high production rate processes.

As an alternative to polishing slurries, abrasives may be incorporated into an article, such as by adherence to a backing or within a three-dimensional matrix.

Examples where the abrasive materials are adhered to a backing to form an abrasive article are disclosed in U.S. Pat. No. 2,865,725 to Schroeder, U.S. Pat. No. 3,959,935 to Stoppacher, and U.S. Pat. No. 3,230,672 to Anthon. Schroeder adheres finely ground cerium oxide powder to a flexible sheet, preferably cotton fabric, to provide a polishing article. Stoppacher adheres an abrasive, such as silicon carbide or garnet, to a pliable sheet of paper, polymer, cloth, or nonwoven textile fabric to provide a lens grinding pad. Anthon discloses cushion mounting oriented particles of an abrasive material on a mesh fabric backing. The abrasive particles are predominately oriented to present their plane faces or facets, and not their sharp edges or points, toward the work surface in a common plane parallel to the support. The oriented abrasive particles are adhered to the backing with an adhesive, such as latex, which is pliable, yieldable, or resilient when set. The cushion mounted abrasive particles can slightly rock, tilt, or recede, to accommodate themselves to the contour of the work surface, thereby reducing surface abrasion and scratching.

Examples where the abrasive is adhered in a three-dimensional matrix are found in U.S. Pat. No. 3,597,887 to Hall, U.S. Pat. No. 4,138,228 to Hartfelt et al., and U.S. Pat. No. 4,842,619 to Fritz et al. Hall discloses an abrasive wheel comprised of individual flexible elements secured together. Each element has an abrasive substance adhered in a matrix of synthetic resinous elastomeric foam permanently bonded in and to a fibrous mesh. Hartfelt et al. discloses adhering particles of abrasive, of average size less than 10 microns, from the rare earth oxide or metal oxide classes of compounds in a microporous polymer matrix coated on a backing. Fritz et al. reports the advantageous incorporation of polishing aids, such as rare earth oxides or potassium fluorobonate, into the abrasive three-dimensional matrix.

Nonwoven abrasive products are also well known, for example, as disclosed in U.S. Pat. No. 2,958,593 to Hoover et al. Such products are characterized by having abrasive particles dispersed throughout, and adhered in, a three-dimensional nonwoven fibrous web. U.S. Pat. No. 4,609,380 to Barnett et al. discloses an abrasive wheel formed by adhering together layers of a nonwoven abrasive material of the type disclosed in Hoover et al., which is improved by the inclusion of a binder system including a blend of a tough adherent binder and a smear-reducing compatible polymer.

An important component of the physical aspect of polishing depends on the relative moduli of the abrasive and the surface. Similarly, the durability of the surface has an important effect on the chemical component of polishing. Chemically durable materials which have high Young's moduli, such as ceramics and glass-ceramics, are difficult to polish by traditional abrasive techniques.

For these and other reasons, the need remains for a high production rate polishing process which smooths glass, ceramic, or glass-ceramic surfaces.

SUMMARY OF THE INVENTION

The present invention relates to a process for polishing glass, ceramic, or glass-ceramic surfaces.

In one aspect of the present invention, the process for polishing a glass surface, a ceramic surface, or a glass-ceramic surface includes exposing the surface to ultraviolet laser radiation under conditions effective to smooth the surface.

In a preferred embodiment, the ultraviolet laser radiation has a wavelength from about 193 nm to about 351 nm. The radiation is produced by a rare gas halide excimer laser operating at a power from about 150 to about 400 mJ/cm$^2$ and selected from the group consisting of ArF, KrF, XeF, and XeCl excimer lasers.

In another aspect, the process for polishing a glass surface, a ceramic surface, or a glass-ceramic surface includes first smoothing the surface to an $R_a$ of about 200 to about 10 Å, as determined by atomic force microscopy ("AFM"), by treating the surface with an abrasive. The surface is then exposed to ultraviolet laser radiation effective to smooth the surface to an $R_a$, of about 4 to about 2 Å, as determined by AFM.

The polishing process of the present invention permits rapid polishing of glass, ceramic, and glass-ceramic surfaces. The method is particularly useful in polishing surfaces with high chemical durability, such as ceramics and glass-ceramics, where polishing by conventional abrasive techniques is extremely slow and requires the use of large amounts of expensive abrasives. Furthermore, with regard to the polishing of glass-ceramic surfaces, the process of the present invention permits non-preferential removal of glass and ceramic material. This produces a significantly smoother surface than that achieved with conventional methods. In addition, the polishing process of the present invention does not cause melting or significant heating of the surface. As a result, the formation of microcracks, which, in turn, can cause catastrophic failure, such as macroscopic fracturing, is avoided. Furthermore, the present invention permits uniform removal of larger amounts of surface material, making it useful as a substitute for the lapping process or, alternatively, as a method for removing the subsurface damage caused by the coarse abrasives used in the lapping process.

DETAILED DESCRIPTION OF THE INVENTION

Figure 1:
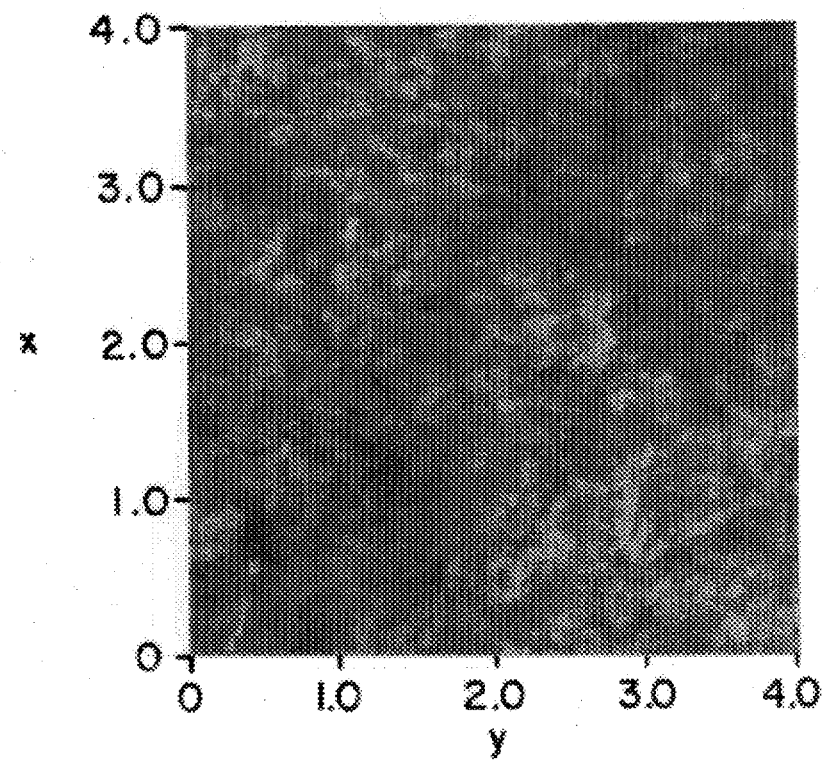
FIG. 1 is an atomic force micrograph illustrating the surface roughness exhibited by the glass ceramic used in Example 1 after polishing by conventional abrading techniques but before polishing with the process of the present invention.

The present invention relates to a process for polishing glass, ceramic, or glass-ceramic surfaces.

One aspect of the present invention provides a method for polishing a glass, ceramic, or glass-ceramic surface. The process includes exposing the surface to ultraviolet laser radiation under conditions effective to smooth the surface.

The surface can be the surface of a homogeneous article, such as a glass article, a ceramic article, or a glass-ceramic article. Alternatively, the glass, ceramic, or glass-ceramic surface can be formed on a substrate made of a different material. The nature of the substrate material, the method by which the glass, ceramic, or glass-ceramic surface is attached thereto, and the thickness of the surface can vary widely.

Ultraviolet radiation corresponds to electromagnetic radiation having a wavelength from about 10 nm to about 400 nm and includes vacuum UV, having a wavelength of about 10 to 200 nm, quartz UV, having a wavelength of about 200–400 nm, ultraviolet-A, having a wavelength of 280–320 nm, and ultraviolet-B, having a wavelength of 315–400 nm, radiation. Preferably, the ultraviolet radiation has a wavelength from about 193 to about 351 nm, more preferably from about 193 to about 250 nm.

Laser radiation is substantially coherent, substantially monochromatic radiation which results from photon stimulated emission. Any laser which can produce radiation in the range from about 10 to 400 nm and deliver the proper power per unit area ("fluence") can be used. Suitable lasers include, for example, solid state, doubled dye, tripled Ti-sapphire, quadrupled Nd, argon ion, pulsed dye, helium-cadmium, neon, doubled ruby, doubled Ti-sapphire, tripled Nd, doubled alexandrite, doubled dye, and excimer lasers. Details regarding the construction and operation of these lasers are described in Hecht, *The Laser Guidebook,2nd ed*, New York: McGraw Hill (1992), which is hereby incorporated by reference.

Suitable excimer lasers include the rare gas halide excimer lasers, such as those which employ Aft, KrCl, KrF, XeCl, and XeF and which emit 193,222,248, 308, and 351 nm radiation, respectively. Radiation having other ultraviolet wavelengths can be produced by Raman shifting the standard excimer lines. Preferably, the ultraviolet laser radiation is excimer laser radiation produced by a rare gas halide excimer laser.

The term excimer laser does not describe a single device, but rather a family of lasers with similar output characteristics. All emit powerful pulses lasting nanoseconds or tens of nanoseconds at wavelengths in or near the ultraviolet.

The term excimer originated as a contraction of "excited dimer," a description of a molecule consisting of two identical atoms which exists only in an excited state; examples include He$_2$ and Xe$_2$. It now is used in a broader sense for any diatomic molecule (and sometimes for triatomic types) in which the component atoms are bound in the excited state, but not in the ground state. That property makes them good laser materials with similar output characteristics. The most important excimer molecules are rare gas halides, compounds such as argon fluoride, krypton fluoride, xenon fluoride, and xenon chloride, which do not occur in nature, but which can be produced by passing an electric discharge through a suitable gas mixture. There are also other types of lasing excimers. Many of these molecules are so similar that they can be made to lase in the same device, which has come to be called an excimer laser. In describing the present invention, excimer is used in its broadest sense, even though some of the species which can be made to lase in excimer laser devices are not true excimers.

Details regarding the construction and operation of excimer lasers are disclosed in Hecht, *The Laser Guidebook, 2nd ed*, New York: McGraw-Hill, pp. 211–234(1992); Rhodes, ed., *Excimer Lasers, 2nd ed*, New York: Springer-Verlag; "Lambda Lasers: The UV-tool for industrial innovative applications", and "Lambda Physik excimer lasers: 15 years of excellence in excimer laser technology", both published by Lambda Physik, Inc., Gottingen, Germany; Lambda Highlights No. 1 (October 1986), Lambda Industrial No. 4 (October 1988), Lambda Industrial No. 6 (June 1989), and Lambda Industrial No. 8 (November 1994), all published by Lambda Physik, Inc., Gottingen, Germany, which are hereby incorporated by reference. Excimer lasers are available commercially, for example, from Lambda Physik, Inc., Acton, Mass., Lumonics, Inc., Livonia, Mich., Questek, Inc., Billerica, Mass., and Siemens AG, Karlstein, Germany.

The smoothness of the surface after treatment with the process of the present invention depends primarily on three factors: total energy applied to the surface per unit area, the nature of the glass, ceramic, or glass-ceramic surfaces, and the roughness of these surfaces prior to ultraviolet polishing.

One method for increasing the smoothness of the glass, ceramic, or glass-ceramic surfaces produced by the ultraviolet polishing process of the present invention is to smooth the material prior to ultraviolet polishing. This can be achieved by first chemical smoothing, such as by acid etching, or mechanically, such as by lapping or by treating the surface with an abrasive. After such preliminary smoothing by these conventional processes, the roughness of the glass, ceramic, or glass-ceramic surface, reported as $R_a$, or arithmetic mean surface roughness, is typically 200 to 10 Å, as measured by AFM. For example, the roughness of unrefined glass, ceramic, or glass-ceramic surfaces can be reduced by exerting pressure on these surfaces with a coated pad. A slurry of abrasive, such as cerium or aluminum oxide in aqueous solution, is dripped on the surface between the pad and the surface. One such process is disclosed in U.S. Pat. No. 2,744,001 to Harman, which is hereby incorporated by reference. Alternatively, roughness can be reduced using abrasives incorporated into a three-dimensional matrix, such as an abrasive wheel, as described in U.S. Pat. No. 4,842,619 to Fritz et al., U.S. Pat. No. 4,138,228 to Hartfelt, and U.S. Pat. No. 3,597,887 to Hall, which are hereby incorporated by reference.

The second factor relates to the nature of the material being polished. Although glass, ceramic, or glass-ceramic surfaces can be advantageously polished by the ultraviolet process of the present invention without regard to chemical composition or physical characteristics, such as, crystal structure, morphology, or crystal orientation, these parameters influence the degree of smoothness attained. When optimizing the polishing of a glass-ceramic, the orientation of the ceramic particles in the glass matrix with respect to each other and to the surface should also be considered.

The third factor which influences the smoothness attained by the ultraviolet polishing process relates to exposure parameters. This factor is significant, because it is the one over which the practitioner has the most control. The smoothness of the surface produced is primarily related to the total energy delivered to the surface per unit area and the uniformity of that energy over the surface being polished. The total energy delivered per unit area is a function of the power of the laser per unit area per pulse and the number of pulses to which the area is exposed. Preferably, the surface is exposed with a total of from about 2 to about 200 J/cm$^2$, more preferably from about 10 to about 80 J/cm$^2$. As the skilled practitioner will note, the total energy delivered to the surface can be achieved by manipulation of several variables: the number of pulses, the power output of the laser per pulse, the amount of attenuation, and the area of glass, ceramic, or glass-ceramic surface exposed per pulse.

No one of these parameters is critical to the successful practice of the present invention. It is preferred, however, that the energy output of the laser, the amount of attenuation, and the area of surface impacted by the laser beam be adjusted so that each pulse delivers to the surface energy greater than the ablation threshold of the material from which the surface is made. The ablation threshold is the energy density of incident ultraviolet radiation below which the radiation is dispersed by modes other than ablation, such as heating of the material. Ablation threshold values for glasses, ceramics, and glass ceramics are very material dependent, and, consequently, must be determined empirically. Preferably each pulse delivers to the surface from about 150 to about 400 mJ/cm$^2$, more preferably from about 200 to about 400 mJ/cm$^2$. In view of the preferred radiation density per pulse and the total energy preferably delivered to the surface, the number of pulses typically used in the practice of the instant invention ranges from about 5 to about 1000, preferably from about 10 to about 100. It is understood, that any combination of pulse quantity and intensity can be used to attain the preferred total energy delivered per unit area of surface, assuming, of course, that the energy per pulse is above the ablation threshold. For example, although not preferred, the method of this invention can be practiced by exposing the surface to ten pulses of a laser having unattenuated power output of 4J/cm$^2$. Since excimer lasers typically produce an energy density of from about 10 to 400 mJ/cm$^2$, they can deliver energy densities in the preferred range to the surface without modification of the emitted beam. Lasers which emit radiation above or below the preferred surface energy density range can be used in the process of the present invention by focusing or dispersing the laser beam, as appropriate, using conventional methods.

Where multiple pulses of laser radiation are employed, the pulse frequency is not critical to successful operation of the process. However, high power levels, high frequency, and insufficient sample thermal conductivity can result in undesirable surface heating and subsequent melting. Of course, the pulse frequency is also limited by the time it takes for the lasing medium to re-equilibrate. Insufficient delay between pulses typically results in decreased performance and a non-linear increase of average power with repetition rate. In solid state lasers, this delay is primarily necessitated by heating of the lasing material, and, consequently, the pulse rate can be increased to a limited extent by cooling the lasing material. Gas lasers can be operated at much higher pulse frequencies than solid-state lasers when the gas is replaced after each pulse with fresh gas, such as, for example, by using a gas recirculating system. Such systems are well known in the art. By using a gas recirculating system, excimer laser pulse frequencies of 1000 Hz and more may be attained. On the other hand, the pulse frequency can be arbitrarily small, with the understanding, of course, that this practice will result in longer polishing times and a decreased efficiency in the polishing process. Consequently, the laser is preferably operated with a pulse frequency as great as the laser will permit, in the range from about 1 to about 1000 Hz, more preferably in the range from about 5 to about 1000 Hz.

Laser operation can be enhanced by modifying the laser device itself or by modifying the beam it generates using conventional means, such as tuning, wavelength selection, line narrowing, single frequency operation, harmonic generation, sum-and-difference frequency generation, parametric oscillation, pulse shortening and lengthening, cavity dumping, amplification, pulse compression, and Raman shifting. In addition, external optics can be used to focus, direct, and manipulate the laser beam. These techniques are detailed in Hecht, *The Laser Guidebook*, 2nd ed., New York:

McGraw Hill, pp. 43-89 (1992), which is hereby incorporated by reference.

Ideally, the beam should be radially and circumferentially uniform in intensity. Where an excimer laser is employed, its radially symmetric but non-uniform beam intensity profile, often characterized as "hat-shaped", can result in a non-uniform smoothness profile. Smoothness uniformity can be increased by a variety of optical techniques. One suitable technique employs a beam homogenizer. Alternatively, the beam can be radially attenuated, such as, for example, by using a mask to block all but the radially-uniform, central portion of the beam.

Depending upon the size of the surface being polished and the cross-sectional area of the laser beam, the beam and surface may require relative movement. Where the total area to be polished can be irradiated at once at the required energy density, conventional beam masking techniques can be used to control the area being polished. Larger areas require beam guidance or workpiece motion during the exposing process. Relative motion of the article and the laser beam can be as simple as manually moving the workpiece. Preferably, the article is moved in a manner which results in exposure of every area of surface to be polished to the same amount of total energy, such as, for example by exposing each area of surface to multiple overlapping exposures. Alternatively, the workpiece can be fixed spatially and the laser beam scanned, such as, for example, in a raster pattern, over the surface. If the article to be polished is three-dimensional, it is often advantageous to rotate the article while exposing it to a laser beam perpendicular to the axis of rotation and advancing the laser beam along a line parallel to the axis of rotation in a pattern of spatial movement analogous to the operation of a lathe.

As discussed previously, prior to polishing with the ultraviolet polishing process of the present invention, the glass, ceramic, or glass-ceramic surfaces, typically, have $R_a$'s from about 100 to about 10 Å, as determined by AFM. Subsequent to treatment with the present polishing process, the glass, ceramic, or glass-ceramic surface typically have $R_a$'s from about 4 to about 2 Å, as measured by AFM.

The processes of the present invention can be used to polish a surface made of glass. Glass is an inorganic, nonmetallic, amorphous solid material. Glass compositions and methods for its manufacture are well known in the art and are reviewed in Flinn et al., *Engineering Materials and Their Applications*, Boston: Houghton Mifflin, pp. 242–309 (1975) and Grayson, ed., *Encyclopedia of Glass, Ceramics and Cement*, New York: Wiley (1985), which are hereby incorporated by reference. Ceramic surfaces are also suitable for polishing by the process of the present invention. Ceramic surfaces include crystalline, non-metallic solids which are made of the oxides, sulfides, borides, carbides, and nitrides of silicon, germanium, and metal ions, such as Be, Mg, Ca, Sr, Ba, Li, Na, K, Rb, Cs, Sc, Y, Ti, Zr, Hf, V, Nb, W, Mn, Tc, Re, Fe, Ru, Os, Co, Rh, Ir, Ni, Pal, Pt, Cu, Au, Ag, Zn, Cd, Hg, Ga, In, TI, Sn, Pb, As, Sb, Bi, the lanthanide metals or combinations thereof, which have been subjected to a temperature of 540° C. and above.

Details regarding the properties, the preparation, the compositions, and the surfaces of ceramics and ceramic surfaces are described in Flinn et al., *Engineering Materials and Their Applications*, Boston: Houghton Mifflin, pp. 242–309 (1975) and Grayson, ed., *Encyclopedia of Glass, Ceramics and Cement*, New York: Wiley (1985), which are hereby incorporated by reference.

The process of the present invention is particularly well-suited for polishing glass-ceramic materials, specifically those glass-ceramics containing spinel, lithium disilicate, or sapphirine crystals, as well as other glass-ceramic materials.

Glass-ceramics comprised predominately of generally uniformly-sized spinel-type crystals uniformly dispersed within a highly siliceous residual glass matrix phase are disclosed in greater detail in U.S. patent application Ser. No. 08/332,703 to Beall et al. now granted as U.S. Pat. No. 5,476,821, which is hereby incorporated by reference. The composition of these glass-ceramic articles expressed in terms of weight percent on the oxide basis, includes: 35–60% $SiO_2$, 20–35% $Al_2O_3$, 0–25% MgO, 0–25% ZnO, at least about 10% MgO+ZnO, 0–20% $TiO_2$, 0–10% $ZrO_2$, 0–2% $Li_2O$, and 0–8% NiO. However, if the $Al_2O_3$ constituent is present in an amount less than about 25%, the $TiO_2$+$ZrO_2$+NiO amount should be at least 5%. The composition may also contain up to 5% of optional constituents, such as BaO, CaO, PbO, SrO, $P_2O_5$, $B_2O_5$, $Ga_2O_3$, 0–5% $R_2O$, or 0–8% of a transition metal oxide; the $R_2O$ can be $Na_2O$, $K_2O$, $Rb_2O$ or $Cs_2O$. Many spinel-type glass ceramics have Knoop hardness of from about 500 to 1500.

Glass ceramics exhibiting a crystal phase assemblage comprised predominately of a mixture of lithium disilicate and tridymite uniformly interspersed with a residual glass phase and forming an interlocked microstructure with the glass are disclosed in U.S. patent application Ser. No. 08/265,192 to Beall et al., which is hereby incorporated by reference. The composition, expressed in terms of weight percent on the oxide basis, includes 75–95% $SiO_2$, 3–15% $Li_2O$, 0–6% $Al_2O_3$, and 0–6% $K_2O$. The nucleating agent for this glass-ceramic can be 0–0.1% Pd or 0–5% $P_2O_5$; however, if Pd is absent, the $P_2O_5$ amount is at least 0.5% and, if $P_2O_5$ is absent, then the Pd amount is at least 0.005%. Additionally, up to 15% of optional ingredients may be added, including $B_2O_3$, $Na_2O$, ZnO, MgO, CaO, SrO, $ZrO_2$, $TiO_2$, F, $Sb_2O_3$, $As_2O_3$, PbO, and BaO.

Glass-ceramics containing a crystal phase assemblage comprised predominantly of a mixture of uniformly distributed sapphirine ($4MgO\text{-}5Al_2O_3\text{---}SiO_2$) and α-quartz crystals exhibiting a crystal/grain size of less than about 1000A are disclosed in U.S. patent application Ser. No. 08/332,704 to now abandoned, which is hereby incorporated by reference. The precursor glass exhibits a composition, expressed in terms of weight percent on the oxide basis, includes: 46–52% $SiO_2$, 23–28% $Al_2O_3$, 12–16% MgO, 0.5–3% $B_2O_3$, 0–5% ZnO, a nucleating agent which can be 5–12% $TiO_2$ or 0–5% $ZrO_2$, and up to 6% of optional ingredients; no more than 3% of the optionals may be alkali oxides.

The present invention is further illustrated by the following example.

EXAMPLE

Figure 3:
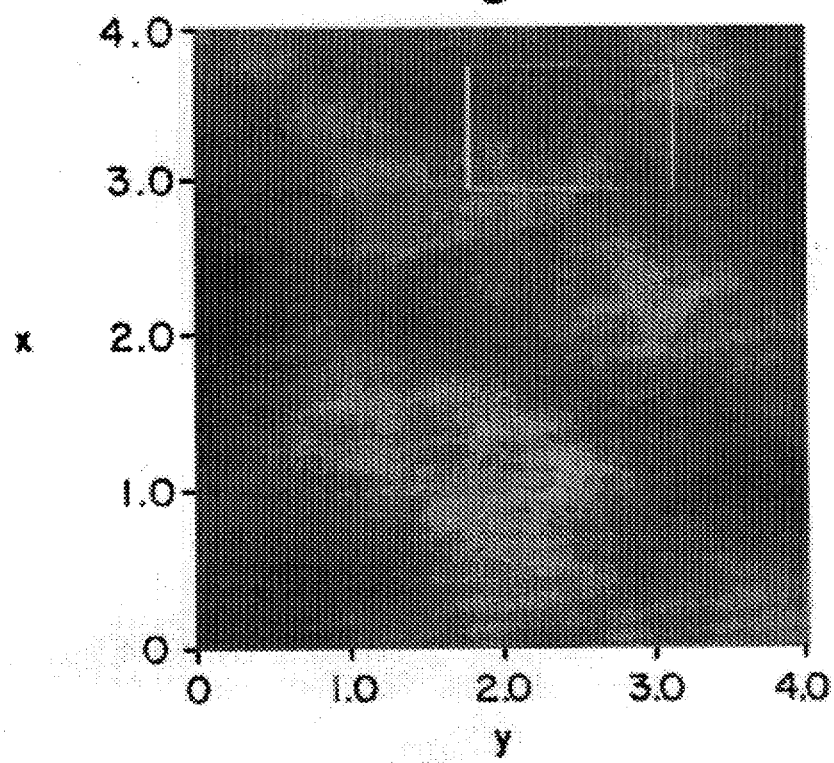
FIG. 3 is an atomic force micrograph illustrating the surface roughness exhibited by the glass ceramic used in Example 1 after polishing with the processes of the present invention.
Figure 2:
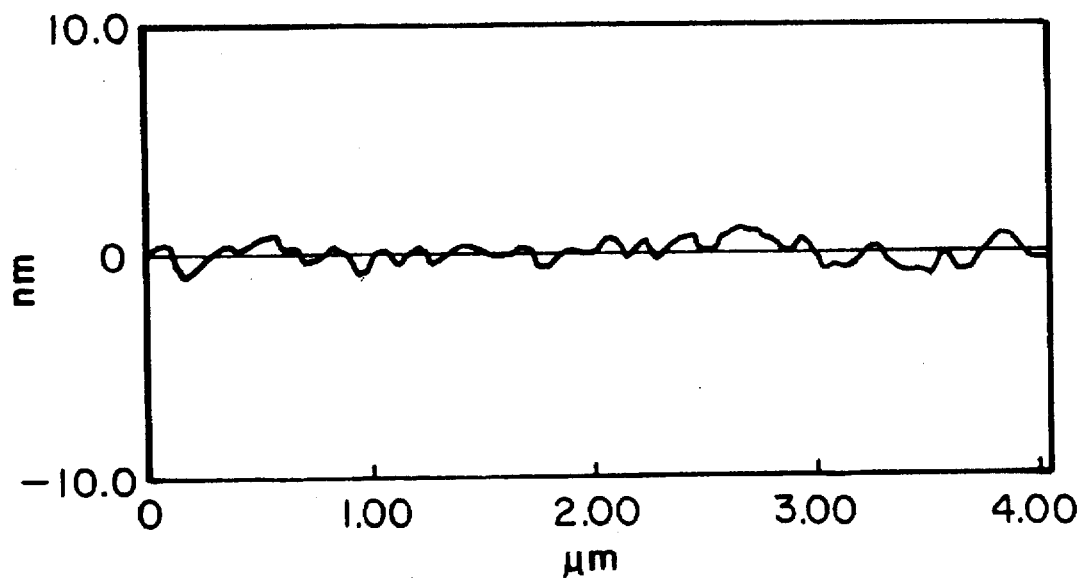
FIG. 2 is a cross-sectional profile of the FIG. 1 atomic force micrograph taken along line A—A.
Figure 4:
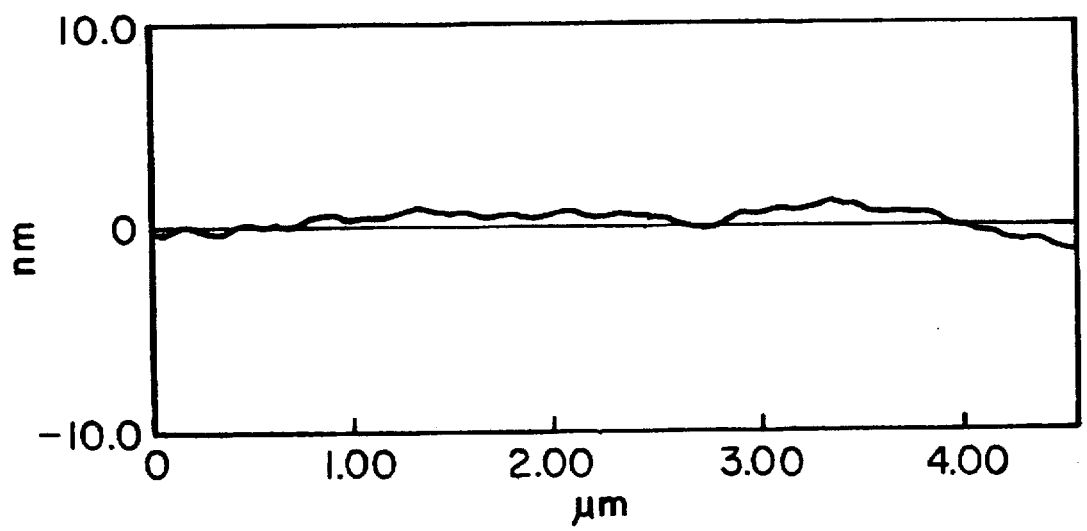
FIG. 4 is a cross-sectional profile of the FIG. 3 atomic force micrograph taken along line A—A.

A glass ceramic containing, by weight, 46.9% $SiO_2$, 24.8% $Al_2O_3$, 1.8% ZnO, 15% MgO, and 11.5% $TiO_2$, was heat-treated, sequentially, by ramping the temperature from room temperature to 800° C. at 300° C./hour, holding the temperature at 800° C. for 2 hours, raising the temperature to 975° C. at a rate of 300° C./hour, holding at 975° C. for 4 hours, and cooling to room temperature at the furnace rate to produce an extremely fine-grained assemblage of spinel structured crystals. The glass ceramic was then polished by lapping with polyurethane pads and abrading with an alumina slurry such that the resulting article had an $R_a$ of 4.77 Å, as measured by AFM. A roughness profile of this material, acquired by AFM, presented in FIG. 1, and a graph of the cross-sectional profile (taken along line A—A of FIG. 1), presented in FIG. 2, illustrates the roughness of the glass ceramic before ultraviolet polishing. The material was then exposed to 100 pulses of an ArF 193 nm ultraviolet excimer laser (Model No. LPX-3151, Lambda Physik, Acton, Mass. operating at 5 Hz and at a power of 300 mJ/cm$^2$. After exposure, the $R_a$ was measured to be 2.28 Å by AFM. The atomic force micrograph of the ultraviolet-polished glass ceramic is presented in FIG. 3, and the cross-sectional profile (taken along line A—A of FIG. 3) is presented in FIG. 4. Comparison of the cross-sectional profiles before and after polishing demonstrates the effectiveness of the process of the present invention. No variation from glass matrix surface to spinel crystal phase surface was observed. In addition, comparing adjacent exposed versus non-exposed surfaces indicated that almost 1000 Å, of material had been removed during the shot sequence.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A process for polishing an entire surface on a glass, or a glass-ceramic article to smooth that surface, said process consisting essentially of:

exposing the surface to ultraviolet laser radiation under conditions effective to remove material from the entire surface to improve the smoothness of the surface.

2. A process according to claim 1, wherein the ultraviolet laser radiation has a wavelength from about 193 nm to about 351 nm.

3. A process according to claim 1, wherein the ultraviolet laser radiation is excimer laser radiation.

4. A process according to claim 3, wherein the excimer laser radiation is produced by a rare gas halide excimer laser.

5. A process according to claim 1, wherein the surface is exposed to ultraviolet laser radiation under conditions such that the energy density of the radiation delivered by each pulse is greater than the ablation threshold of the material, and material is removed to a uniform depth over the exposed surface of the article.

6. A process according to claim 1, wherein the excimer laser operates at a power from about 150 to about 400 mJ/cm$^2$.

7. A process according to claim 1, wherein said exposing is carried out by pulsing the ultraviolet laser radiation.

8. A process according to claim 7, wherein said pulsing is at a frequency from about 5 to about 1000 Hz.

9. A process according to claim 1 wherein a glass-ceramic surface is polished by said exposing.

10. A process according to claim 9, wherein a glass-ceramic surface, comprising spinel-type crystals dispersed in a glass matrix, is polished by said exposing.

11. A process according to claim 10, wherein the glass-ceramic has a Knoop hardness of from about 500 to about 1500.

12. A process according to claim 1, wherein the surface has an $R_a$ after said exposing of about 4 to about 2 Å.

13. A process according to claim 1 wherein the surface is exposed to ultraviolet laser radiation having a wavelength from about 193 nm to about 351 nm, produced by a rare gas halide excimer laser operating at a power from about 150 to about 400 mJ/cm$^2$ and selected from the group consisting of ArF, KrF, XeF, and XeCl excimer lasers, under conditions effective to smooth the surface.

14. A process for polishing an entire surface on a glass, or a glass-ceramic article to smooth that surface, said process consisting essentially of:

a first step of smoothing the surface; and a second step of exposing the surface to ultraviolet laser radiation under conditions effective to remove material from the entire surface to improve the smoothness of the surface.

15. A process according to claim 14, wherein said first step of smoothing is effected by treating the surface with an abrasive prior to said exposing.

16. A process according to claim 14, wherein the surface has an $R_a$ of 200 to about 10 Å, as measured by atomic force microscopy prior to said exposing.

17. A process according to claim 14 wherein the surface is smoothed to an $R_a$ of about 200 to about 10 Å, as measured by atomic force microscopy, by treating the surface with an abrasive, and then exposing the surface to ultraviolet laser radiation under conditions effective to smooth the surface to an $R_a$ of about 4 to about 2 Å, as measured by atomic force microscopy.

* * * * *